US00RE41060E

(19) United States
(12) Reissued Patent
Yu

(10) Patent Number: US RE41,060 E
(45) Date of Reissued Patent: Dec. 29, 2009

(54) MULTI-FUNCTIONAL CHARGER WITH POWER GENERATING AND ILLUMINATION FUNCTIONS

(75) Inventor: Yung-Chia Yu, Taipei (TW)

(73) Assignee: Daniel Tai, Naperville, IL (US)

(21) Appl. No.: 11/349,522

(22) Filed: Feb. 8, 2006

Related U.S. Patent Documents

Reissue of:
(64) Patent No.: 6,690,141
Issued: Feb. 10, 2004
Appl. No.: 10/233,828
Filed: Sep. 3, 2002

(51) Int. Cl.
*H01M 10/46* (2006.01)

(52) U.S. Cl. ..... 320/107
(58) Field of Classification Search ..... 320/101, 320/107, 112, 113, 114, 115; 310/80, 83, 310/75 R, 67 A, 67 R; 290/1 C
See application file for complete search history.

(56) References Cited

U.S. PATENT DOCUMENTS 4,105,314 A 8/1978 Hughes, Jr.
4,227,092 A 10/1980 Campagnuolo et al.
4,280,168 A 7/1981 Potter
4,360,860 A 11/1982 Johnson et al.
6,168,288 B1 1/2001 St. Claire
6,690,141 B1 * 2/2004 Yu ..... 320/107
6,957,897 B1 10/2005 Nelson et al.

* cited by examiner

*Primary Examiner*—Edward Tso
(74) *Attorney, Agent, or Firm*—Michael P. Mazza, LLC

(57) ABSTRACT

A multi-functional charger with power generating and illumination functions comprises a device body, a gear set, a generator, a voltage and current control loop, a battery, and a movable rod. When the movable rod rotates, the generator will operate by the driving of the gear set so as to generate a current. The current is suppressed, rectified and regulated by the voltage and current control loop. It can be determined to be stored in the battery or outputted through a plug by the switching of the switch. The power stored in the battery can be supplied to the LED lamp or to be outputted. When the power is outputted, a plug serves to be connected to an electric device to be charged. To achieve the requirement of illumination, the generator is connected to an external bulb set. Thereby, the charger can be used in various applications.

21 Claims, 7 Drawing Sheets

Amended

FIG. 2 Amended
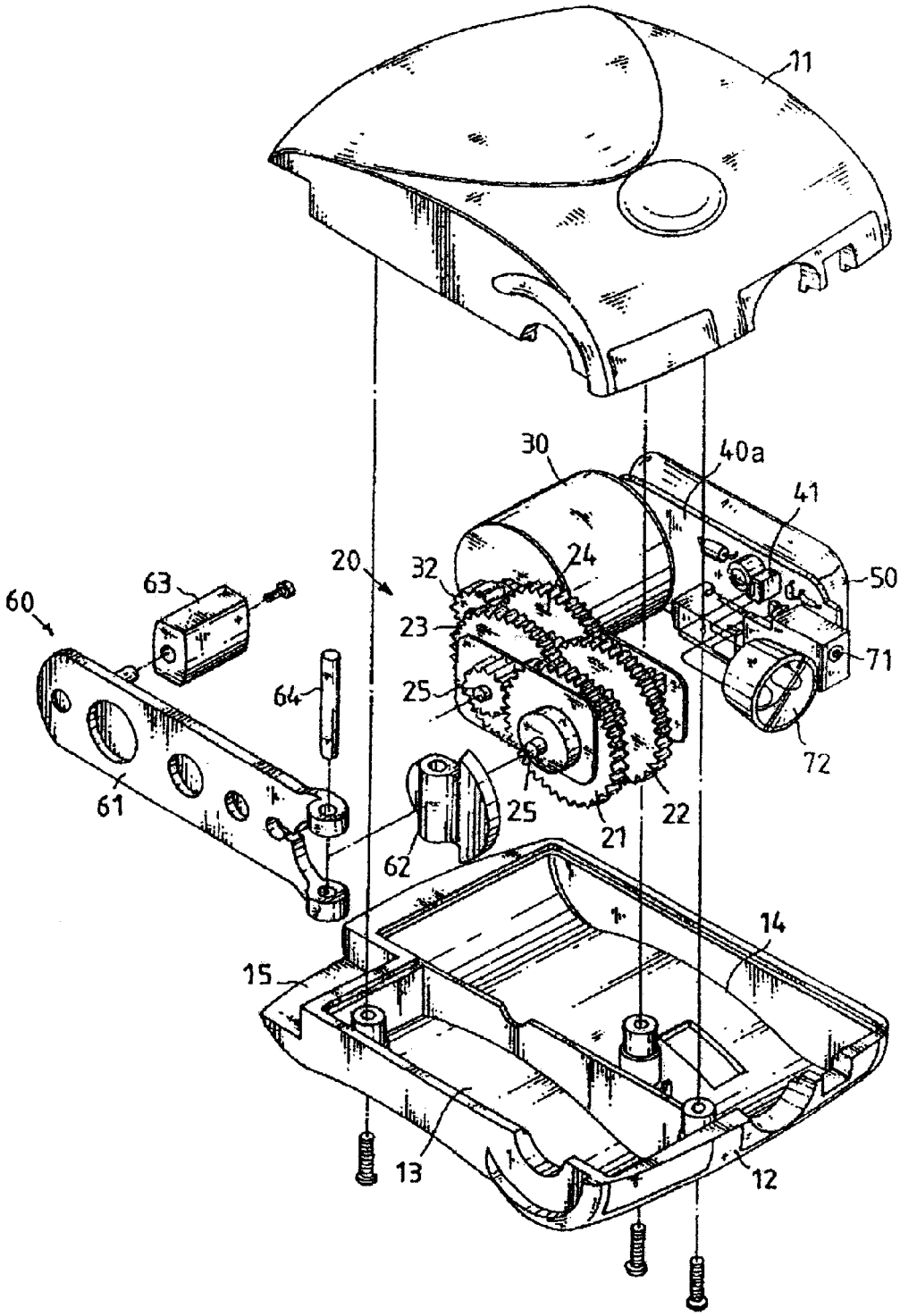

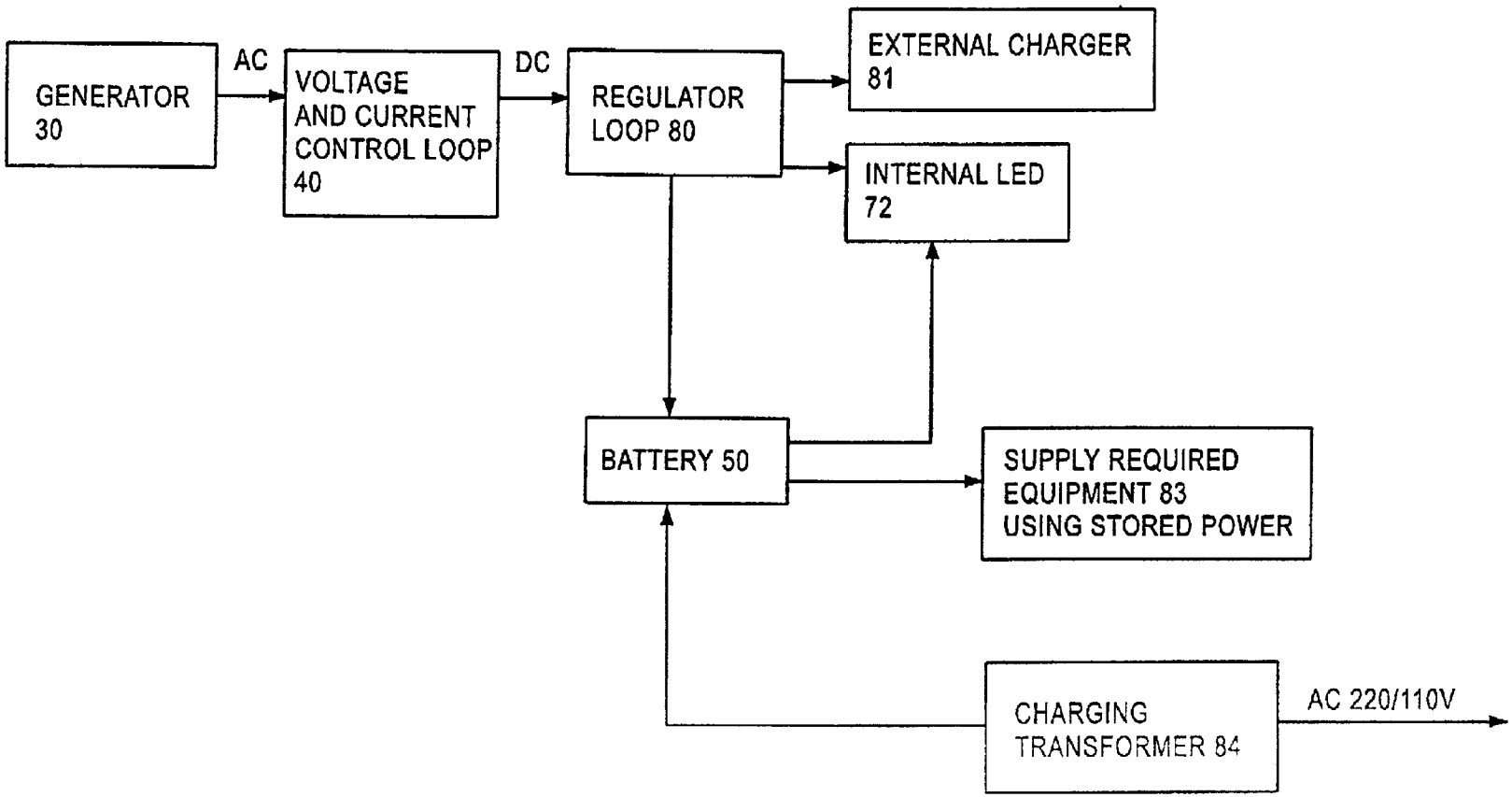
Amended
FIG. 5

FIG. 6 Amended
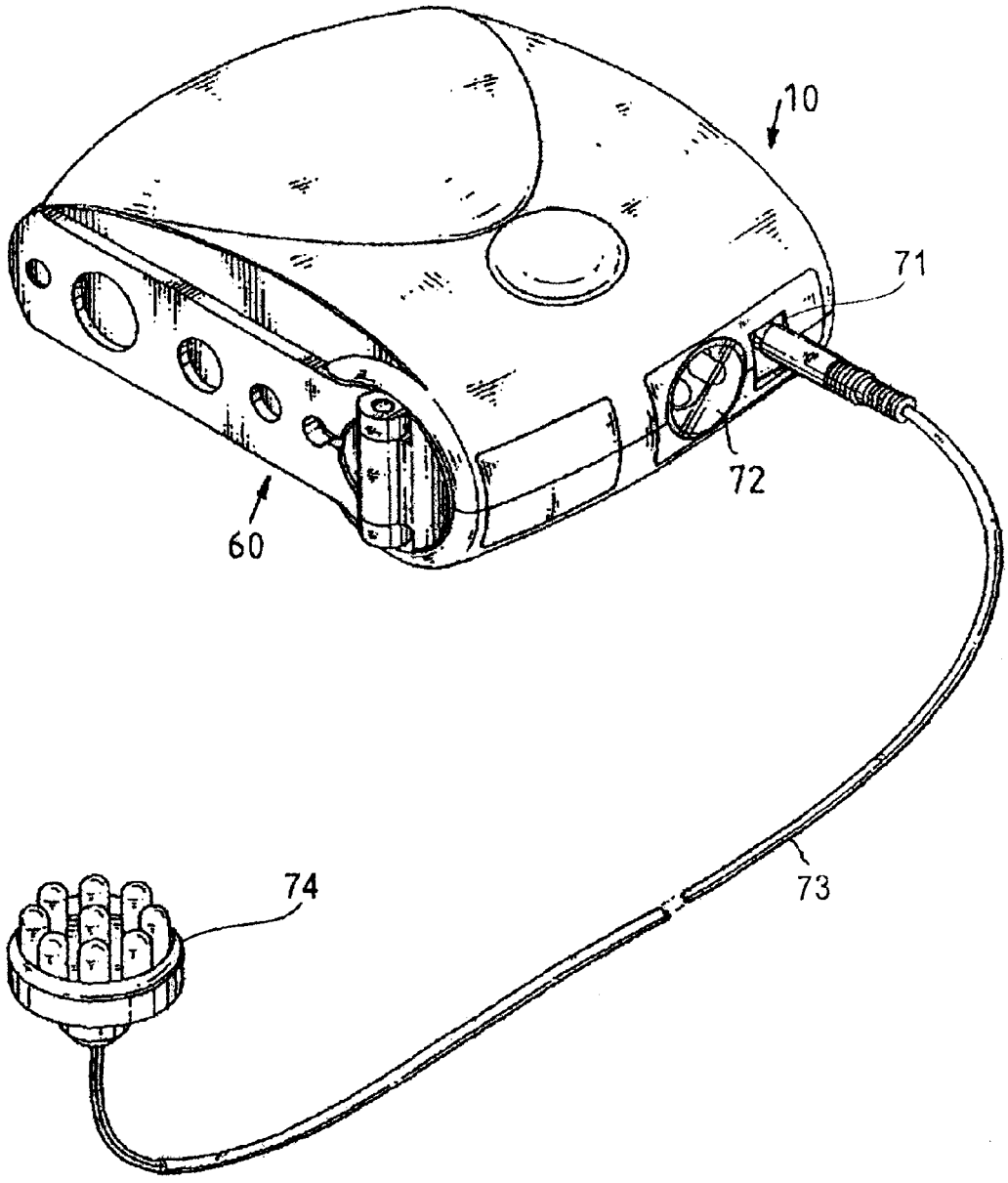

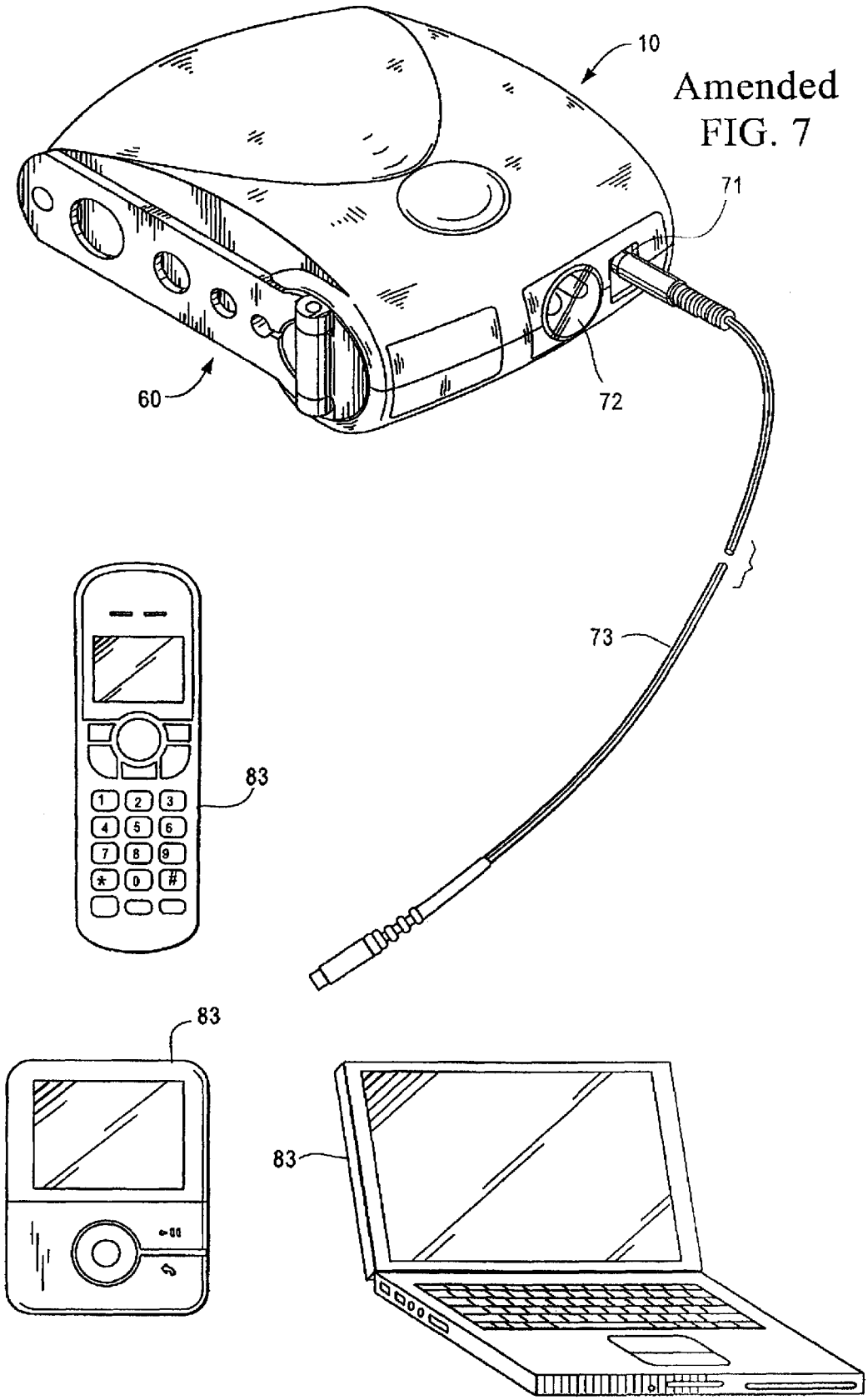
10
Amended
FIG. 7
71
60
72
73
83
83
83

MULTI-FUNCTIONAL CHARGER WITH POWER GENERATING AND ILLUMINATION FUNCTIONS

Matter enclosed in heavy brackets [ ] appears in the original patent but forms no part of this reissue specification; matter printed in italics indicates the additions made by reissue.

FIELD OF THE INVENTION

The present invention relates to power [charger] *chargers*, and particularly to multi-functional [charger] *chargers* with power generating and illumination functions.

BACKGROUND OF THE INVENTION

In the current modern life, electric devices are used frequently, almost everybody needs to use electric devices in the daily life. Such devices are for example notebook computers, mobile phones, portable audio recorders, etc. However, in general, these devices are portable and thus are necessary to be charged by a charger. In general, the charger is lack of a generator. Thereby, the charger must be connected to a power source for receiving power and then charges the power to these devices. Thereby, the prior art charger has no illuminating lamp and thus it is inconveniently for being used in the dark.

SUMMARY OF THE INVENTION

Accordingly, the primary object of the present invention is to provide a multi-functional charger with power generating and illumination functions. The charger comprises a device body, a gear set, a generator, a voltage and current control loop, a battery, and a movable rod *or hand crank*. When the [movable rod rotates] *hand crank is rotated*, the generator will operate by the driving of the gear set so as to generate a current. The current is suppressed, rectified and regulated by the voltage and current control loop. It can be [determined to be] stored in the battery or outputted through [a plug] *an output portion* (*e.g., a jack*) by the switching of the switch. The power stored in the battery can be supplied to the LED lamp or [to] *it can* be outputted. When the power is outputted, [a plug serves to] *the output portion* (*e.g., a jack*) *can* be connected to an electric device to be charged. Or to achieve the requirement of illumination, it [is] *can be* connected to an external bulb set. Thereby, the present invention can be used in various applications.

The various objects and advantages of the present invention will be more readily understood from the following detailed description when read in conjunction with the appended [drawing] *drawings*.

BRIEF DESCRIPTION OF THE DRAWINGS

FIG. 2 is an exploded perspective view of the present invention.

FIG. 5 is a block diagram showing the function and process of the present invention.

FIG. 6 is a schematic view showing one embodiment about the illumination of the present invention.

FIG. 7 is a schematic view showing power output way in the present invention.

DETAILED DESCRIPTION OF THE PREFERRED EMBODIMENTS

Figure 1:
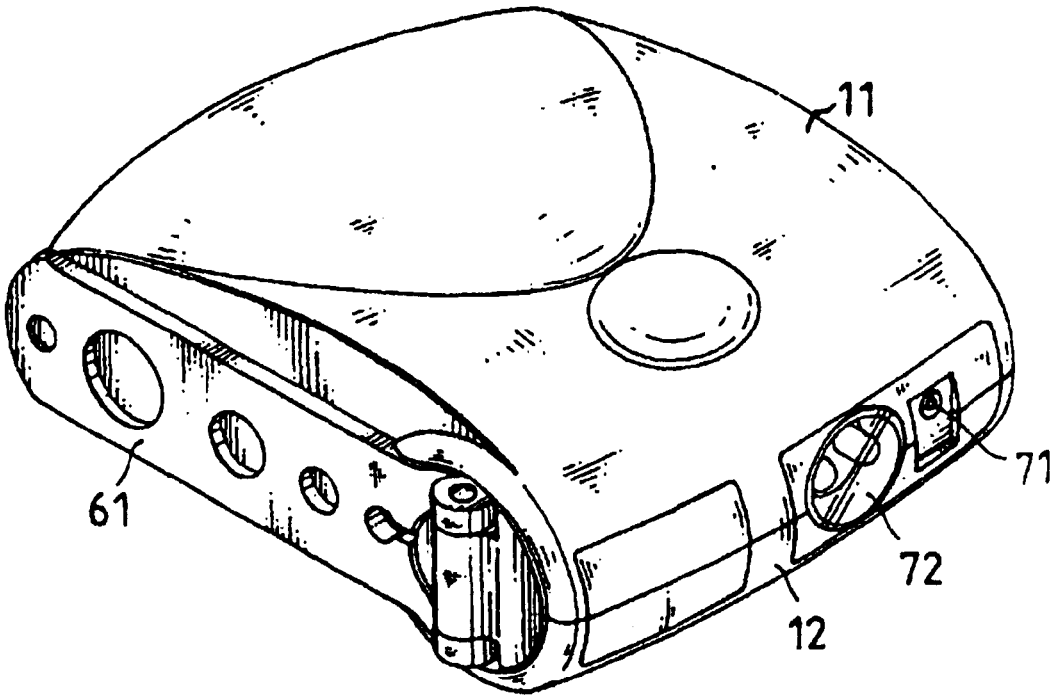
FIG. 1 is an assembled perspective view of the present invention.
Figure 3:
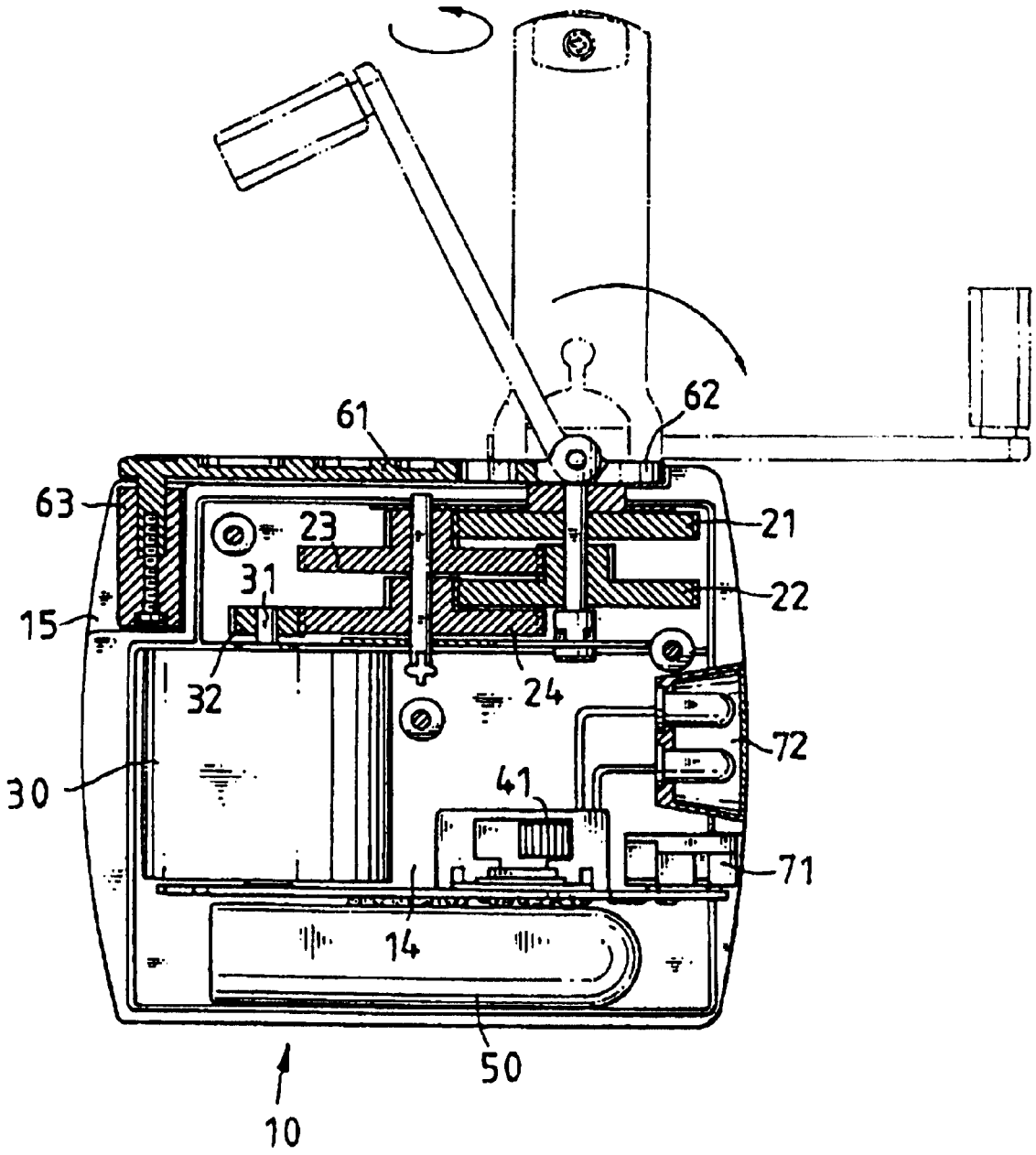
FIG. 3 is a cross sectional view of the present invention.

Referring to FIGS. 1 and 3, the multi-functional charger with power generating and illumination functions of the present invention is illustrated. The multi-functional charger with power generating and illumination functions includes a device body 10, a gear set 20, a generator 30, a voltage and current control loop 40, a battery 50, and a movable rod 60.

The device body 10 is formed by an upper casing 11 and a lower casing 12. The inner edge thereof is formed with a first receiving space 13, a second receiving space 14, and a third receiving apparatus 15 for receiving the gear set 20, the generator 30, the voltage and current control loop 40 and the battery 50.

The gear set 20 includes a first gear 21, a second gear 22, a third gear 23, and a fourth gear 24. Two pivot rods 25, 25' pass through the gears 21, 22, 23 and 24 to be pivoted to a front end of the first receiving space 13 of the device body 10. One pivot rod 25 passes through the first and second gears, 21 and 22, and another pivot rod 25' passes through the third and fourth gears 23 and 24. The gears 21, 22, 23 and 24 are alternatively arranged so as to form a driving system. One outer lateral side of the gear set 20 is pivoted to the movable rod 60. By rotating the movable rod 60, the gear set 20 is driven to rotate.

The generator 30 is a smaller type generator which is installed at a rear side of the second receiving space 14 of the device body 10. One side of the generator 30 has a driving shaft 31. A driving gear 32 is engaged to the driving shaft 31. The driving gear 32 is engaged to one end of the gear set 20. Thereby, the generator 30 can be driven to generate power by the gear set 20.

The voltage and current control loop 40 is an IC circuit board which convert the AC current from the generator 30 to DC current. The voltage and current control loop 40, an output portion 71 and an LED light are placed at a front end of the second receiving space 14 of the device body 10. The voltage and current control loop 40 is electrically connected to the generator 30. Thereby, the voltage and current control loop 40 is also connected to the battery 50, output portion 71, and LED light 72. Other than storing the power generating by the generator 30, power generated by the generator 30 can be outputted to outer elements, or to the LED light 72. A control switch 41 in the voltage and current control loop 40 is used to control the power storage or output.

The battery 50 is received in the second receiving space 14 of the device body 10. The battery 50 is a component for storing power from the generator 30.

Figure 4:
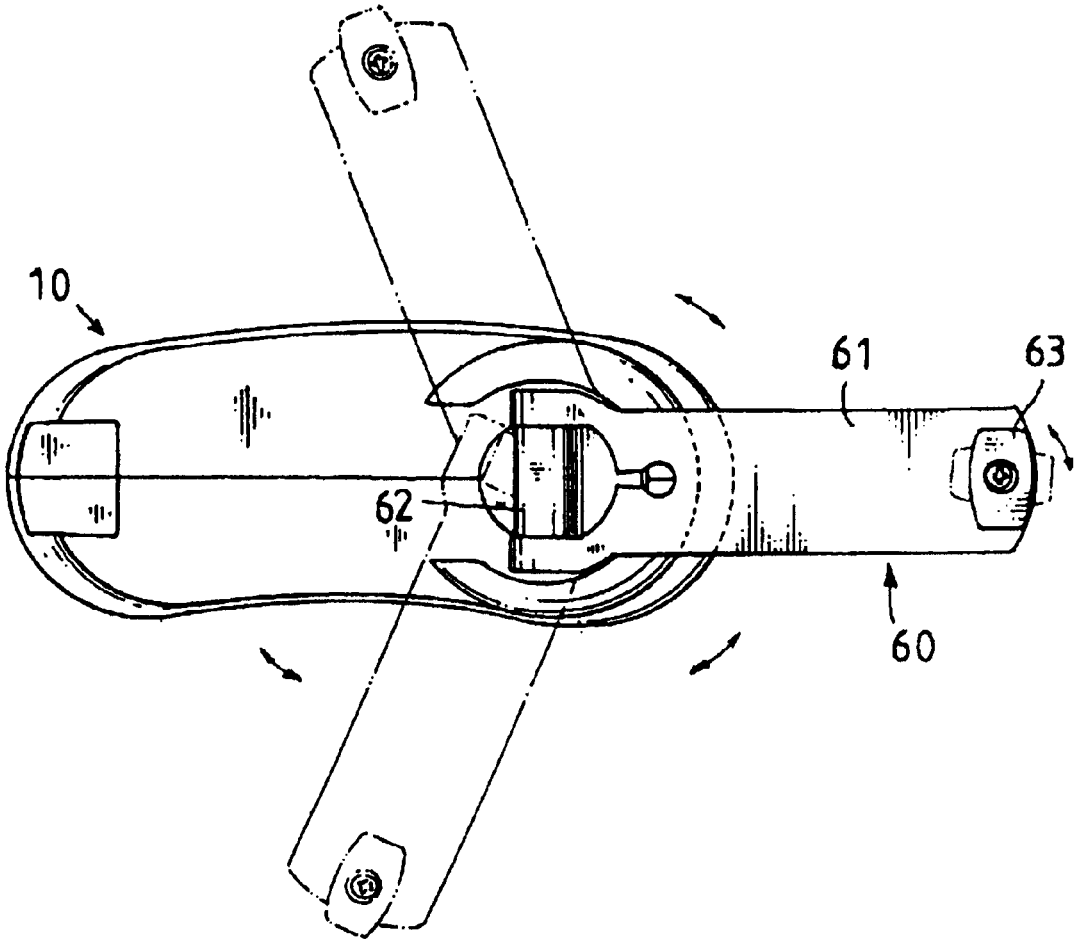
FIG. 4 is a schematic view showing the storage of power according to the present invention.

The movable rod *or hand crank* 60 is installed at one lateral side of the device body 10. The movable rod 60 is formed by a *rod* body 61, a *coupler* pivot rod 62, and a handle 63. The *rod* body 61 has [an] *a* Y shape. One end of the *rod* body 61 is pivotally connected to the device body 10 by a pin 64. The pivot rod 62 is coupled at one lateral side of the device body 10. The pivot rod 62 can rotate through 180 degrees. The handle 63 is another side of the *rod* body 61 can be received in the third receiving space 15 of the *device* body 10 so as to present [a beautiful outlook] *an attractive appearance* and to be carried conveniently (referring to FIG. 4). It should [by] *be* noted that when the pivot rod 62 is firmly secured to the device body 10, it is connected to one end of the gear set 20 so that the movable rod 60 can drive the gear set 20 to rotate.

Referring to FIG. 5, a block diagram for illustrating *alternative embodiments of* the present invention [is] *are* illustrated. When the movable rod 60 rotates, the generator 30 will operate by [the] driving [of the] gear set 20 so as to [generator] *generate* a current. The current is suppressed, rectified and regulated by the voltage and current control loop 40. Then the current flow*s* to a regulator loop 80. Then the power can be outputted to an external charger 81 or internal LEDs [82] *72* or to a charger*/battery* 50 for further supply to other required equipment 83 [or to a]. *A* charging transformer 84 *may be used to charge battery 50.*

As illustrated in FIGS. 6 and 7, in another embodiment, the [power of the current] *energy from generator 30* can be stored in the battery 50 or outputted through [a plug 73] *an output portion 71* (*e.g., a jack, see FIG. 1*) by switching the switch 41. The power stored in the battery 50 can be supplied to the LED lamp 72 or [to be] *it can be* outputted. When the power is outputted, [a plug 73 serves to] *output portion 71* (*e.g., jack 71*) *can* be connected *via cable 73* to an electric device *83* to be charged[. Moreover, to achieve the requirement of illumination, it is connected to], *such as* an external bulb set 74 (*see FIG. 6*), *or to a handset, a portable audio device or a notebook 83* (*see FIG. 7*). Thereby, the present invention can be used in various [application] *applications*.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multi-functional charger with power generating and illumination functions comprising a device body, a gear set, a generator, a voltage and current control loop, a battery, and a movable rod; wherein the device body is formed by an upper casing and a lower casing; an inner edge of the device body is formed with a plurality of receiving spaces for receiving the gear set, the generator, the voltage and current control loop and the battery;

the gear set includes a first gear, a second gear, a third gear, and a fourth gear; two pivotal rods pass through the gears to be pivoted to one receiving space of the device body; each [first pivot] *pivotal* rod passes through [the] two different gears; the four gears are alternatively arranged so as to form a driving system; one outer lateral side of the gear set is pivoted to the movable rod;

the generator is installed in the device body and one side of the gear set opposite to the side of the gear set *which* is installed with the movable rod; another end of the generator has a driving shaft; a driving gear is engaged to the driving shaft; the driving gear is engaged to one end of the gear set; thereby, the generator is driven to generate power by the gear set; and the voltage and current control loop is an [IC] *integrated* circuit board which convert AC current from the generator to DC current; one end of the voltage and current control loop is connected to a battery for storing power from the generator and another end of the voltage and current control loop is connected to an output portion for outputting the power *to an electrical device*, or is connected to an LED for illumination, *wherein the voltage and current control loop is capable of charging the electrical device or the LED even if the battery is not charged.*

2. The multi-functional charger with power generating and illumination functions [as claimed in] *of* claim 1, wherein [a] *the* movable rod is[.] formed by a *rod* body, a [second] *coupler* pivot rod [is] *coupled to the rod body* and a handle; one end of the *rod* body is pivotally connected to the device body by a pin and *is* capable of rotating through 180 degrees; and the handle at another [side] *end* of the *rod* body is received in the device body.

3. The multi-functional charger with power generating and illumination functions [as claimed in] *of* claim 1, further comprising a control switch which is connected to the voltage and current control loop for [controlling] *directing* the current generated by the generator to be stored in the battery or to be outputted *to an output portion*.

4. The multi-functional charger with power generating and illumination functions [as claimed in] *of* claim 1, wherein the output portion is *operatively* connected to an [electric] *electrical* device through a [plug] *jack* so as to [charge] *provide* power to the [electric] *electrical* device.

5. The multi-functional charger with power generating and illumination functions [as claimed in] *of* claim 4, wherein the [electric] *electrical* device is selected from one of a group containing *a* handset, a portable audio device, and a notebook.

*6. The multi-functional charger with power generating and illumination functions of claim 1, wherein the output portion comprises an electrical device powered directly from the battery.*

*7. The multi-functional charger with power generating and illumination functions of claim 1, wherein stored power is provided to an LED powered by the battery.*

*8. The multi-functional charger with power generating and illumination functions of claim 1, wherein the electrical device comprises a light bulb.*

*9. A charger with power generating and illumination functions, comprising:*

*a device body housing a gear set, a generator, a voltage and current control loop, and a battery;*

*the gear set being connected to a hand crank and including a plurality of gears disposed in the device body, the gears being arranged so as to form a driving system;*

*the generator having a driving shaft engaged to a driving gear, and the driving gear being driven by the driving system to generate power; and*

*the voltage and current control loop comprising an electrical circuit which converts AC current from the generator to DC current, wherein the voltage and current control loop provides regulation for charging the battery and provides power for powering an electrical device, and wherein the control loop is capable of powering the electrical device even if the battery is not charged.*

*10. The charger with power generating and illumination functions of claim 9, wherein the electrical device comprises a LED.*

*11. The charger with power generating and illumination functions of claim 9, wherein the hand crank comprises a rod body and a handle, one end of the rod body is pivotally connected to the device body and capable of rotation, and the handle is received within a recess in the device body.*

*12. The charger with power generating and illumination functions of claim 9, further comprising a control circuit in electrical communication with the voltage and current control loop for directing the current generated by the generator to the battery, to an LED, or to an external electrical device, or for directing the current generated by the generator from the battery to the LED or to the external electrical device.*

*13. The charger with power generating and illumination functions of claim 12, wherein the current transmitted to the battery is then transmitted to an external device.*

*14. The charger with power generating and illumination functions of claim 12, wherein the electrical device is selected from one of a group including a handset, a portable audio device, or a notebook.*

*15. The charger with power generating and illumination functions of claim 9, wherein the electrical circuit comprises an integrated circuit.*

*16. A charger with power generating and illumination functions, comprising:*

*a device body housing a gear set, a generator, a voltage and current control loop, a battery, and a crank shaft;*

*the gear set comprising a plurality of gears disposed in the device body, and the gears being arranged so as to form a driving system capable of being driven by the crank shaft and in mechanical communication with a generator; and*

*the voltage and current control loop comprising an electrical circuit which converts AC current from the generator to DC current, wherein the voltage and current control loop: rectifies current and regulates voltage; electrically communicates with the battery for storing power from the generator; and electrically communicates with a LED for providing illumination, and wherein the control loop is capable of powering an electrical device based on power from the battery, or based on power provided solely from the crank shaft, the generator and the voltage and current control loop.*

*17. A charger with power generating and illumination functions, comprising:*

*a device body housing a gear set, a generator, an electrical circuit, and a battery;*

*the gear set comprising a plurality of gears disposed in the device body, the gears being arranged so as to form a driving system in mechanical communication with a generator;*

*the electrical circuit being operatively connected to the battery for storing power from the generator, and being operatively connected to a LED for providing illumination; and*

*a hand crank operatively connected to the driving system to communicate human power to the driving system;*

*wherein the control loop is capable of powering an electrical device or the LED even if the battery is not charged.*

*18. The charger with power generating and illumination functions of claim 17, wherein the hand crank is configured to fold substantially flat against the device body when not in use.*

*19. The charger with power generating and illumination functions of claim 17, wherein the electrical circuit is operatively connected to an external device to enable charging of the electrical device.*

*20. The charger with power generating and illumination functions of claim 19, wherein the external device is selected from one of a group containing: a handset; a portable audio device; or a notebook.*

*21. A multi-functional charger with power generating and illumination functions comprising:*

*a device body, a gear set, a generator, a voltage and current control loop, a battery, and a movable rod, wherein the device body is formed by an upper casing and a lower casing, and the gear set includes a plurality of gears arranged to form a driving system;*

*an inner edge of the device body being formed with a plurality of receiving spaces for receiving the gear set, the generator, the voltage and current control loop and the battery;*

*a generator having a driving shaft and being installed in the device body, the gear set being connected to the generator and being capable of being driven by a hand crank to provide power from the generator;*

*a driving gear engaged to the driving shaft and to the gear set; and*

*the voltage and current control loop comprising an electrical circuit which converts AC current from the generator to DC current, wherein the voltage and current control loop is connected to a battery for storing power from the generator, and the control loop is also connected either to an output portion for outputting the power to an external electrical device, or to an LED for illumination, and wherein the control loop can power the external electrical device or the LED even if the battery is not charged.*

* * * * *

UNITED STATES PATENT AND TRADEMARK OFFICE

CERTIFICATE OF CORRECTION

PATENT NO. : RE41,060 E
APPLICATION NO. : 11/349522
DATED : December 29, 2009
INVENTOR(S) : Yung-Chia Yu It is certified that error appears in the above-identified patent and that said Letters Patent is hereby corrected as shown below:

Assignee incorrectly identified as Daniel Tai. Please amend to:

Assignee: Original Creations, Inc., Naperville, IL

Signed and Sealed this
Fifth Day of April, 2011

David J. Kappos

David J. Kappos
*Director of the United States Patent and Trademark Office*

US00RE41060C1

(12) EX PARTE REEXAMINATION CERTIFICATE (8826th)

United States Patent

Yu

(10) Number: US RE41,060 C1

(45) Certificate Issued: Jan. 31, 2012

(54) MULTI-FUNCTIONAL CHARGER WITH POWER GENERATING AND ILLUMINATION FUNCTIONS

(75) Inventor: Yung-Chia Yu, Taipei (TW)

(73) Assignee: Original Creations, Inc., Naperville, IL (US)

Reexamination Request:
No. 90/011,613, Apr. 1, 2011

Reexamination Certificate for:

| | |
|---|---|
| Patent No.: | **Re. 41,060** |
| Issued: | **Dec. 29, 2009** |
| Appl. No.: | **11/349,522** |
| Filed: | **Feb. 8, 2006** |

Certificate of Correction issued Apr. 5, 2011.

Related U.S. Patent Documents

Reissue of:

(64) Patent No.: 6,690,141
Issued: Feb. 10, 2004
Appl. No.: 10/233,828
Filed: Sep. 3, 2002

(51) Int. Cl.

| | |
|---|---|
| ***H01M 10/46*** | (2006.01) |
| ***H02J 7/32*** | (2006.01) |
| ***H02K 7/18*** | (2006.01) |

(52) U.S. Cl. ..... 320/107

(58) Field of Classification Search ..... 320/115
See application file for complete search history.

(56) References Cited

To view the complete listing of prior art documents cited during the proceeding for Reexamination Control Number 90/011,613, please refer to the USPTO's public Patent Application Information Retrieval (PAIR) system under the Display References tab.

*Primary Examiner*—Margaret Rubin

(57) ABSTRACT

A multi-functional charger with power generating and illumination functions comprises a device body, a gear set, a generator, a voltage and current control loop, a battery, and a movable rod. When the movable rod rotates, the generator will operate by the driving of the gear set so as to generate a current. The current is suppressed, rectified and regulated by the voltage and current control loop. It can be determined to be stored in the battery or outputted through a plug by the switching of the switch. The power stored in the battery can be supplied to the LED lamp or to be outputted. When the power is outputted, a plug serves to be connected to an electric device to be charged. To achieve the requirement of illumination, the generator is connected to an external bulb set. Thereby, the charger can be used in various applications.

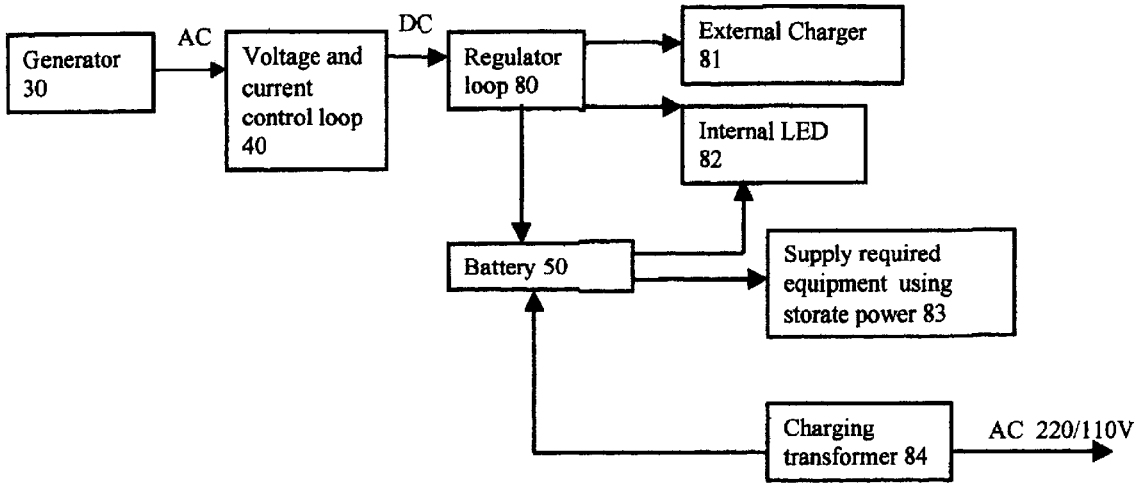

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the original patent but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

The patentability of claims 9-15 is confirmed.

Claims 1, 16, 17 and 21 are determined to be patentable as amended.

Claims 2-8 and 18-20, dependent on an amended claim, are determined to be patentable.

1. A multi-functional charger with power generating and illumination functions comprising a device body, a gear set, a generator, a voltage and current control loop, a battery, and a movable rod; wherein the device body is formed by an upper casing and a lower casing; an inner edge of the device body is formed with a plurality of receiving spaces for receiving the gear set, the generator, the voltage and current control loop and the battery;

the gear set includes a first gear, a second gear, a third gear, and a fourth gear; two pivotal rods pass through the gears to be pivoted to one receiving space of the device body; each [first pivot] *pivotal* rod passes through [the] two different gears; the four gears are alternatively arranged so as to form a driving system; one outer lateral side of the gear set is pivoted to the movable rod;

the generator is installed in the device body and one side of the gear set opposite to the side of the gear set *which* is installed with the movable rod; another end of the generator has a driving shaft; a driving gear is engaged to the driving shaft; the driving gear is engaged to one end of the gear set; thereby, the generator is driven to generate power by the gear set; and the voltage and current control loop is an [IC] *integrated* circuit board which convert AC current from the generator to DC current; one end of the voltage and current control loop is connected to a battery for storing power from the generator and another end of the voltage and current control loop is connected to an output portion for outputting the power *to an electrical device*, or is connected to an LED for illumination, *wherein the voltage and current control loop* provides regulation for charging the battery and *is capable of charging the electrical device or the LED even if the battery is not charged.*

*16. A charger with power generating and illumination functions, comprising:*

*a device body housing a gear set, a generator, a voltage and current control loop, a battery, and a crank shaft;*

*the gear set comprising a plurality of gears disposed in the device body, and the gears being arranged so as to form a driving system* in mechanical *capable of being driven by the crank shaft and in mechanical communication with a generator; and*

*the voltage and current control loop comprising an electrical circuit which converts AC current from the generator to DC current, wherein the voltage and current control loop: rectifies current and* [[*regulates voltage*]] provides regulation for charging the battery*; electrically communicates with the battery for storing power from the generator; and electrically communicates with a LED for providing illumination, and wherein the control loop is capable of powering an electrical device based on power from the battery or based on power provided solely from the crank shaft, the generator and the voltage and current control loop.*

*17. A charger with power generating and illumination functions, comprising:*

*a device body housing a gear set, a generator, an electrical circuit* including a voltage and current control loop, *and a battery;*

*the gear set comprising a plurality of gears disposed in the device body, the gears being arranged so as to form a driving system in mechanical communication with a generator;*

*the electrical circuit being operatively connected to the battery for storing power from the generator, and being operatively connected to a LED for providing illumination; and*

*a hand crank operatively connected to the driving system to communicate human power to the driving system;*

*wherein the* voltage and current *control loop* provides regulation for charging the battery and *is capable of powering an electrical device or the LED even if the battery is not charged.*

*21. A multi-functional charger with power generating and illumination functions comprising:*

*a device body, a gear set, a generator, a voltage and current control loop, a battery, and a movable rod, wherein the device body is formed by an upper casing and a lower casing, and the gear set includes a plurality of gears arranged to form a driving system;*

*an inner edge of the device body being formed with a plurality of receiving spaces for receiving the gear set, the generator, the voltage and current control loop and the battery;*

*a generator having a driving shaft and being installed in the device body, the gear set being connected to the generator and being capable of being driven by a hand crank to provide power from the generator;*

*a driving gear engaged to the driving shaft and to the gear set; and*

*the voltage and current control loop comprising an electrical circuit which converts AC current from the generator to DC current, wherein the voltage and current control loop is connected to a battery for storing power from the generator, and the* voltage and current *control loop is also connected either to an output portion for outputting the power to an external electrical device, or to an LED for illumination, and wherein the* voltage and current *control loop* provides regulation for charging the battery and *can power the external electrical device or the LED even if the battery is not charged.*

* * * * *